United States Patent [19]

King et al.

[11] Patent Number: 5,307,384
[45] Date of Patent: Apr. 26, 1994

[54] SEGMENTED COIL ASSEMBLY FOR CONTROL ROD DRIVE

[75] Inventors: John E. King, Plum Boro; James E. Gillett, Greensburg; Raymond M. Calfo, Murrysville, all of Pa.

[73] Assignee: Westinghouse Electric Corp., Pittsburgh, Pa.

[21] Appl. No.: 991,803

[22] Filed: Dec. 16, 1992

[51] Int. Cl.⁵ ............................................. G21C 7/06
[52] U.S. Cl. .................................... 376/228; 376/232
[58] Field of Search ............................. 376/228, 232

[56] References Cited

U.S. PATENT DOCUMENTS

| 4,484,093 | 11/1984 | Smith | 376/228 |
| 4,508,984 | 4/1985 | Guedj et al. | 376/228 |
| 4,582,675 | 4/1986 | Germer | 376/336 |
| 4,597,934 | 7/1986 | Bollinger et al. | 376/228 |
| 4,640,811 | 2/1987 | Peletan | 376/228 |
| 4,696,783 | 9/1987 | Lesauliner et al. | 376/228 |
| 4,756,868 | 7/1988 | Savary et al. | 376/229 |
| 5,009,834 | 4/1991 | Tessaro | 376/228 |
| 5,089,211 | 2/1992 | Dillmann | 376/232 |

Primary Examiner—Donald P. Walsh
Assistant Examiner—Frederick H. Voss

[57] ABSTRACT

A segmented electromagnetic coil assembly for use in a magnetic jack type of drive mechanism used to move control rods within a nuclear reactor. The coil assembly has a plurality of individual magnetic coils spaced around and against the non-magnetic housing which contains the control rod drive shaft.

9 Claims, 4 Drawing Sheets

SEGMENTED COIL ASSEMBLY FOR CONTROL ROD DRIVE

BACKGROUND OF THE INVENTION

Field of the Invention

The invention relates generally to nuclear reactors and more particularly to control rod drive mechanisms that raise and lower control rods used in the nuclear reactor.

In commercial nuclear reactors, heat, from which steam and ultimately electricity are generated, is produced by fissioning of a fissile material such as enriched uranium. This fissile material or nuclear fuel, is typically contained within a nuclear core made up of a number of fuel rods supported in a plurality of nuclear fuel assemblies, arranged in a spaced parallel array.

Movable control rods are dispersed throughout the core to control the fission process. The control rods generally comprise a plurality of elongated rods containing neutron absorbing materials which fit in longitudinal openings defined in the fuel assemblies and among the fuel rods by guide thimbles of the fuel assemblies. The guide thimbles guide the control rods during their movement into and out of the core. Inserting a control rod into the core adds more neutron absorber material and decreases the nuclear reaction; conversely, withdrawing a control rod removed neutron absorber material and increases the nuclear reaction and thereby the power output of the core. The nuclear reactor core and the control rods are positioned within and supported by a reactor vessel through which a reactor coolant flows.

The control rods are supported in cluster assemblies that can be moved into and from the nuclear core by control rod drive mechanisms which, in turn, are mounted by an upper internal arrangement located within the nuclear reactor vessel above the nuclear core. Typically, a reactor vessel is pressurized to a relatively high internal pressure. The control rod drive mechanisms operate within the same pressure environment that exists within the reactor vessel. The control rod drive mechanisms are housed within shaft housing which are tubular extensions of the reactor pressure vessel.

One of the more commonly used type of control rod drive mechanisms is referred to as a "magnetic jack". With this type of drive mechanism, the control rods are jacked into and from the nuclear core in a series of motions, each involving moving the control rod a discrete incremental distance or "step". Such movement is commonly referred to as stepping of the control rods. This magnetic jack type of mechanism is illustrated and described in U.S. Pat. No. 3,158,766 to Frisch and U.S. Pat. No. 3,992,225 to DeWesse which are assigned to the assignee of the present invention.

This magnetic jack type of control rod drive mechanism includes three electromagnetic coils and a plurality of armature discs which are operated to raise and lower a drive rod shaft and thereby the control rod cluster assembly. The three coils are mounted about and outside of the shaft housing. Two of the coils actuate respective shaft movable and stationary gripper discs contained within the shaft housing. The third coil actuates a lift disc. Actuation of the movable and stationary discs, in turn, operates sets of circumferentially spaced latches which grip the drive rod shaft having multiple axially-spaced circumferential grooves. The stationary gripper latches are actuated to hold the drive rod shaft in a desired axial position. The movable gripper latches are actuated to raise and lower the drive rod shaft. Each jacking or stepping movement of the control rod drive mechanism moves the drive rod shaft about $\frac{5}{8}$ inch (1.58 cm) The jacking or stepping movement is accomplished by the operation of the three sets of axially spaced electromagnetic coils to actuate the corresponding stationary, movable and lift discs so as to alternately and sequentially grip, move and release the control rod drive shaft of the respective mechanism.

In the known magnetic jack type of control rod drive mechanisms, the three coils which are mounted about and outside of the shaft housing were spool type coils in which a spool of non-magnetic material was wound with circumferential wrappings of wire to form a donut shaped coil around the spool and the pressure housing from the shaft.

In the known design, the spool type coils could not be fitted directly against the outside wall surface of the shaft housing because of flanges and other appurtenances on the housing. As a result the spool type coils had to be larger than the outside diameter of the shaft housing and positioned away from the outside wall surface of the shaft housing. This arrangement also required the use of magnetic yoke and magnetic spacer rings to magnetically couple the coil to the magnetic discs contained within the shaft housing.

Such an arrangement required coils that were larger than necessary and the magnetic yokes and spacer rings added to the cost and complexity of the mechanism.

Another limitation to the known spool type coils was that they provided a symmetric magnetic field within the shaft housing which did not provide flexibility in operating the control rod shafts in response to any unbalanced loads on the shafts.

SUMMARY OF THE INVENTION

It is an object of the invention to provide a new design for a magnetic coil assembly suitable for use in a magnetic jack type of drive mechanism for moving control rods within a nuclear reactor.

It is a further object of this invention to provide a magnetic coil assembly that is more efficient and more versatile for use in a magnetic jack type of drive mechanism.

It is still a further object of this invention to provide a magnetic coil assembly that is easier and less expensive to construct and install than the known spool type magnetic assemblies.

These and other objects of this invention can be attained by a magnetic jack type of drive mechanism for moving control rods within a nuclear reactor comprised of a non-magnetic tubular housing member containing a control rod drive shaft, a plurality of interactive movable and stationary magnetic discs within the housing member which are adapted to move and grip the control rod drive shaft in a number of predetermined positions. Three magnetic coil assemblies of this invention are spaced along that portion of the tubular housing member which contains the movable and stationary magnetic discs. Each magnetic coil assembly is comprised of a plurality of individual magnetic coils spaced around and against the outside periphery of the tubular housing member which contains the control rod drive shaft.

BRIEF DESCRIPTION OF THE DRAWINGS

The invention is disclosed with reference to certain exemplary embodiments as shown in the appended drawings. It should be understood that the invention is not limited to the exemplary embodiments and is subject to variation in accordance with the description and the appended claims. In the drawings.

DETAILED DESCRIPTION OF THE PREFERRED EMBODIMENTS

Figure 1:
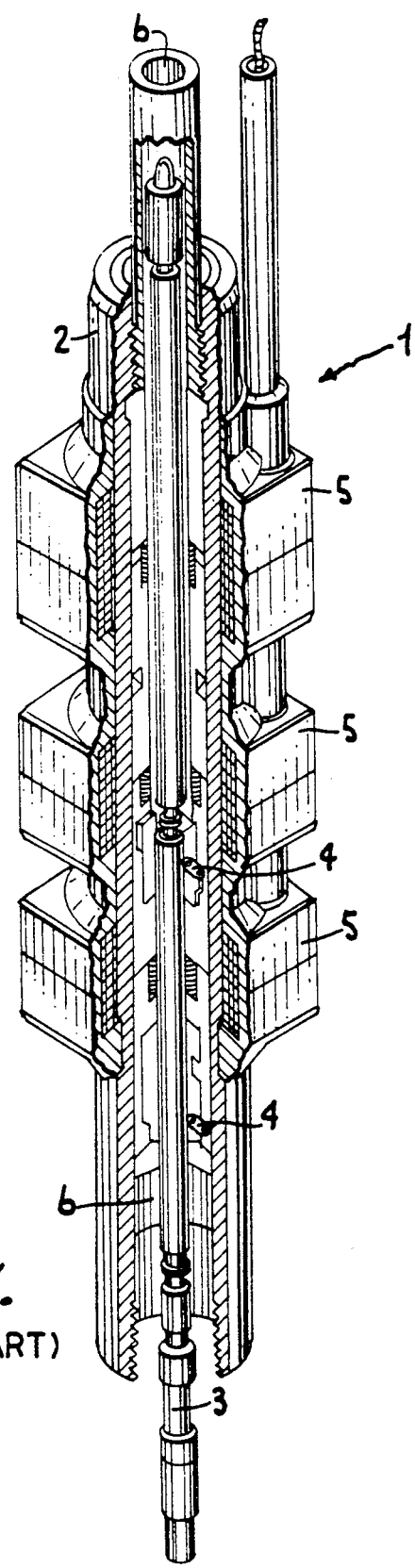
FIG. 1 is a longitudinal perspective view of a prior art control rod drive mechanism on a nuclear reactor.
Figure 2:
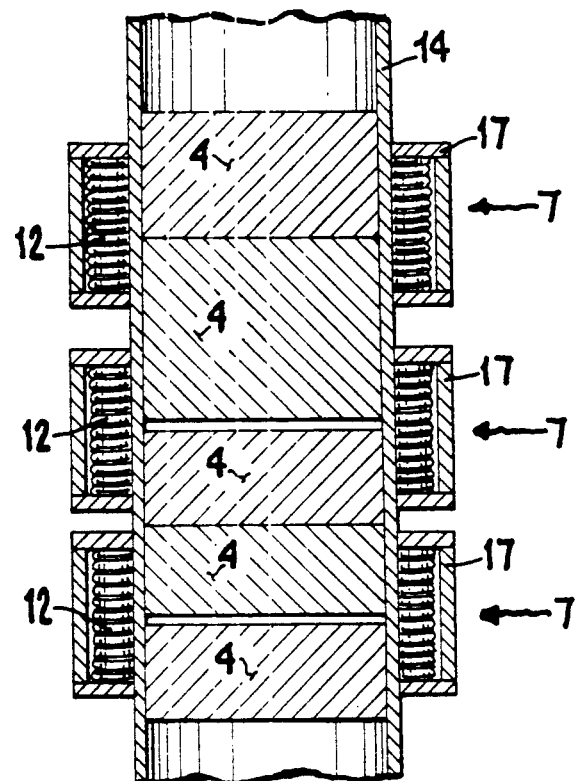
FIGS. 2, 3, 4 and 5 are sectional views of portions of a prior art control rod drive mechanism using spool type magnetic coil assemblies.

Referring to FIG. 1, we have illustrated an isometric sectional view of a typical prior art magnetic jack drive mechanism 1 used to raise and lower control rods in a nuclear reactor. The control rod mechanism 1 basically comprises a tubular housing member 2, an elongated control rod drive shaft 3, a plurality of interactive movable and stationary magnetic discs 4 contained within the housing member 2, and three electromagnetic coil assemblies 5. The tubular housing member 2 is constructed of a non-magnetic material and has a central passage 6 containing the elongated control rod drive shaft 3 which is attached to the control rods themselves (not shown). The tubular housing member 2 is threaded at its lower end and hermetically sealed into the nuclear reactor vessel (not shown).

The magnetic jack drive mechanism uses the three electromagnetic coil assemblies 5 and the magnetic discs 4 which act as armatures within the electromagnetic coil assemblies 5, to raise and lower the control rod drive shaft 3 and in turn the control rods themselves. As shown in FIG. 1, the three electromagnetic coil assemblies 5 are mounted axially along and around and outside of the tubular housing member 2. Two of the electromagnetic coil assemblies 5 actuate plungers of movable and stationary magnetic discs 4 contained within the tubular housing member 2. The third electromagnetic coil assembly 5 actuates a lifting plunger attached to a movable magnetic disc 4. Actuation of the movable and stationary plungers in turn operate sets of circumferentially spaced latches which grip multiple, axial spaced grooves on the elongated control rod drive shaft 3. The stationary latches hold the control rod drive shaft 3 in the desired axial position. The movable latches are actuated to raise or lower the control rod drive shaft 3. The jacking movement of the control rod drive shaft 3 is thus handled by the sequenced operation of the three axially spaced electromagnetic coil assemblies 5 to actuate the corresponding magnetic discs 4 and their related plungers and latches so as to alternately and sequentially grip, move and release the control rod drive shaft 3.

Presently, spool type electromagnetic coil assemblies 7, as shown in FIGS. 2-5, are used in the magnetic jack drive mechanism 1. The spool type coil assemblies 7 are generally comprised of a spool 8 made of a non-magnetic material and having an upper flange 9 and a lower flange 11 designed to retain the circumferential donut-shaped coil wire with winding 12. The inside diameter 12 of the spool 8 is sized to fit over and around the tubular housing member 2.

Figure 3:
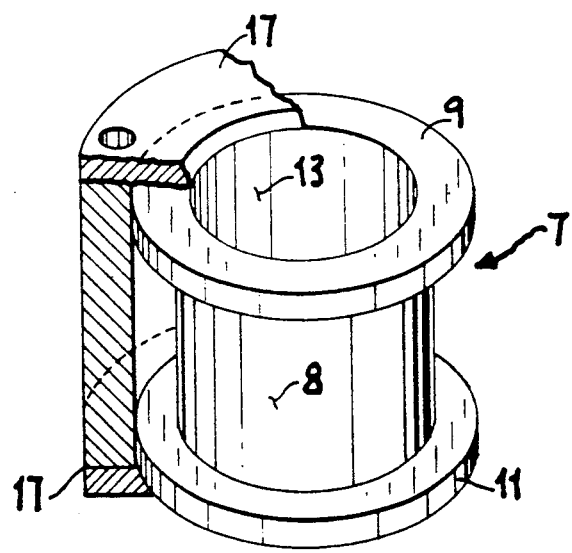
Figure 4:
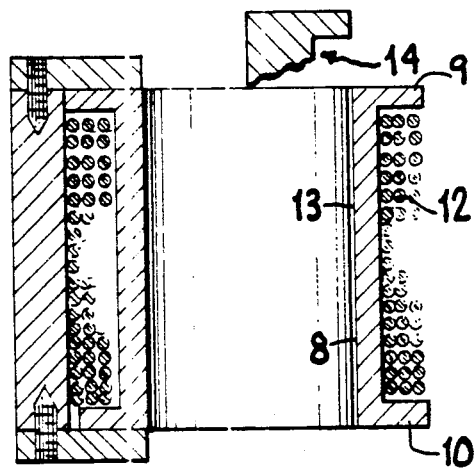
Figure 5:
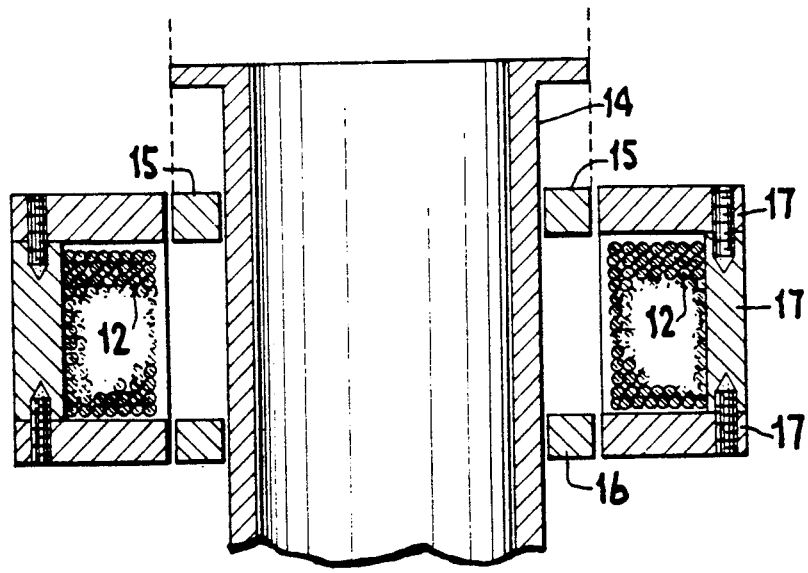

One disadvantage with the prior art spool type coil assemblies 7 is that the spool 8 cannot be fitted directly against the outside wall 14 of the tubular housing member 2. This is due to the inherent shape and the presence of flanges on the outside of tubular housing member 2 as shown in FIG. 3. To prevent excessive magnetic flux leakage, the spool type coil assemblies require upper 15 and lower 16 magnetic spacer rings and a magnetic yoke assembly 17 to surround the spool 8 to direct the magnetic flux through the wall 14 of the tubular housing member 2 to the magnetic discs 4. This arrangement positions the winding 12 away from the outside wall 14 of the tubular housing member 2 and results in a coil assembly that is less magnetically and space efficient than a coil assembly that could be tightly fitted to the outside of the wall 12.

The spool type of coil assembly 7 by its symmetrical design produces a symmetrical magnetic field within the tubular housing member 2. At times, it is desirable to produce a non-uniform magnetic field within a particular magnetic disc 4 to offset non-uniform loads on the control rod drive shaft which sometimes will cause the magnetic discs 4 to tilt and bind. As a result, the spool type coil assemblies need to be oversized to overcome friction forces caused by the tilting or binding magnetic discs 4.

Figure 6:
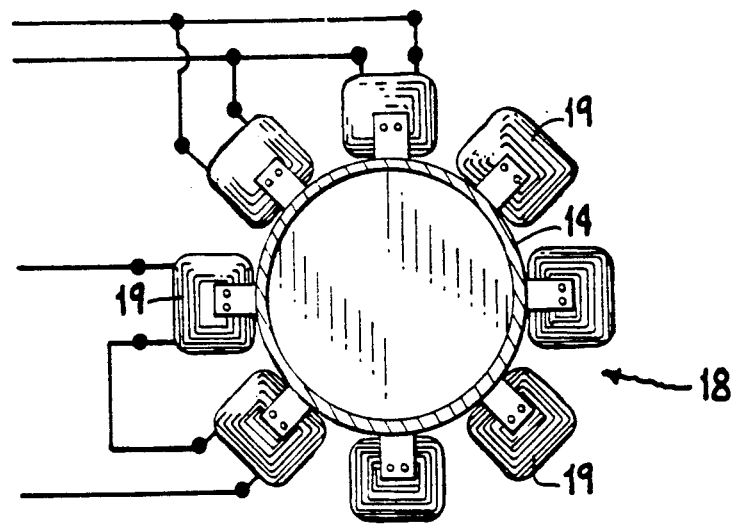
FIGS. 6 and 7 are top and side sectional views illustrating the magnetic coils according to one embodiment of this invention.
Figure 7:
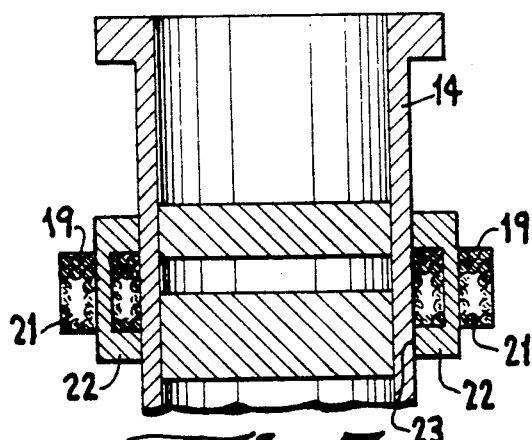

FIGS. 6 and 7 illustrate one embodiment of our invention and show a segmented electromagnetic coil assembly 18 comprised of a plurality of individual magnetic coils 19 spaced equally around and against the outer surface of the outside wall 14 of the tubular housing member 2. In this embodiment the windings 21 of the coil 19 are wound around a "C" shaped magnetic core 22, the ends 23 of which are closely coupled to the outer surface of outer wall 14 of the tubular housing member 2 shown in FIGS. 6 and 7, since they do not have to fit over flanges or other projections on the tubular housing member 2. This arrangement eliminates the need for any magnetic spacer rings 15 and 16 and reduces flux leakage outside the wall 12 of the tubular housing member 2.

Another advantage of the segmented coil assembly 18 of this invention is the fact that the individual coils can be connected to the power supply either in series or in parallel as illustrated in FIG. 6. This allows for variation in the coil circuit inductance and time constants to achieve the acquired rate of the lifting and latching operations.

The segmented coil assembly 18 also permits compensation for unbalanced loads on the lifting discs 4. In this case, the individual magnetic coils 19 can be wound with different numbers of wire turns in the windings 21 or, the coils can be concentrated to one side of the vessel. This allows for locally varying the magnetic field strength inside the tubular housing member 2 and altering the magnetic force distributed circumferentially to offset any unbalanced loads on the control rod drive shaft 3.

The segmented coil assemblies 18 also perform better thermally for a given power level because the windings are less concentrated than in the spool type design where all of the heat generated at the innermost windings must flow through the spool 8 which has a low thermal conductivity, or through the winding 12 itself and into the yoke 17. With the segmented coil assemblies 18 of this invention, each individual coil 19 is separated from its neighboring individual coil 19 by a coolant, such as forced air.

Figure 8:
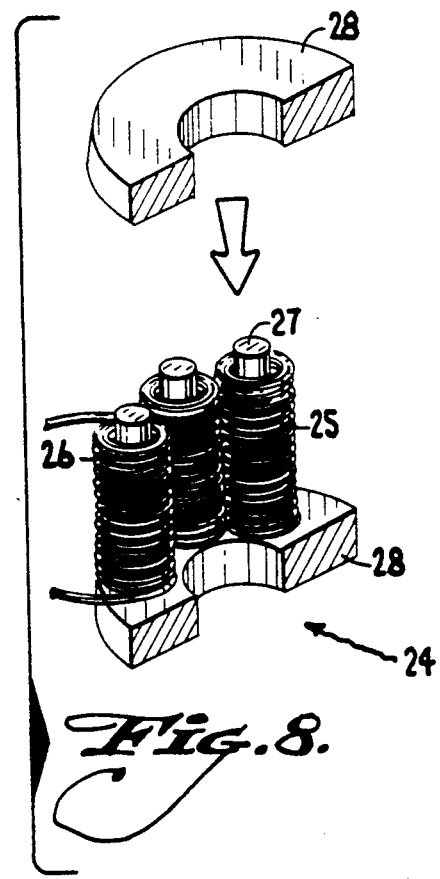
FIG. 8 is an isometric view illustrating another embodiment of this invention.

FIG. 8 illustrates another embodiment of this invention and shows a segmented coil assembly 24 in which each individual magnetic coil 25 consists of a winding 26 wound on a rod-like core 27 of a magnetic material which extends between a pair of parallel, semi-circular segments 28 of magnetic material. While we have shown three individual magnetic coils 23 per segment 28, the actual number of individual coils 25 and the amount of windings 26 per soil can be varied as required. If necessary, the segments can be connected by an outer ring (not shown) on magnetic material to enclose the individual magnetic coils 25 and reduce leakage of the magnetic flux.

It is believed the present invention and its advantages will be understood from the above description and it will be apparent that changes may be made in the form, construction and arrangement as described without departing from the scope of this invention.

We claim:

1. A magnetic jack-type of drive mechanism for moving control rods within a nuclear reactor comprising:
   (A) a non-magnetic tubular housing member containing a control rod drive shaft;
   (B) a plurality of interactive movable and stationary magnetic discs and associated latches within said housing member adapted to axially move and grip said control rod drive shaft in a number of predetermined positions,
   (C) three magnetic coil assemblies spaced axially along the portion of said tubular housing containing said magnetic discs and associated latches, each magnetic coil assembly comprising a plurality of individual magnetic coils spaced equally around and against the outside periphery of said tubular housing member.

2. The mechanism of claim 1 in which each individual magnetic coil is wound on a "C" shaped magnetic core.

3. The mechanism of claim 2 in which the ends of the "C" shaped core are positioned against the outside periphery of said tubular housing member.

4. The mechanism of claim 1 in which each individual magnetic coil is connected electrically in parallel to the other individual magnetic coils in the magnetic coil assembly.

5. The mechanism of claim 1 in which each individual magnetic coil is connected electrically in series to the other individual magnetic coils in the magnetic coil assembly.

6. The mechanism of claim 1 in which at least one individual magnetic coil in a magnetic coil assembly is wound with a different number of turns of wire than the other individual magnetic coils in said magnetic coil assembly.

7. The mechanism of claim 1 in which each individual magnetic coil is separated from its neighboring individual magnetic coil by a coolant.

8. The mechanism of claim 1 in which a plurality of individual magnetic coils extend between a pair of spaced, parallel, semi-circular segments of magnetic material extending radially from the outside periphery of said tubular housing member.

9. The mechanism of claim 8 in which each individual magnetic coil is wound on a rod-like core of magnetic material extending between said pair of parallel, semi-circular segments.

* * * * *